US011103909B2

(12) United States Patent
Olsson

(10) Patent No.: US 11,103,909 B2
(45) Date of Patent: Aug. 31, 2021

(54) METHOD AND MACHINE SYSTEM FOR CONTROLLING AN INDUSTRIAL OPERATION

(71) Applicant: Tomologic AB, Stockholm (SE)

(72) Inventor: Magnus Norberg Olsson, Stockholm (SE)

(73) Assignee: Tomologic AB, Stockholm (SE)

( * ) Notice: Subject to any disclaimer, the term of this patent is extended or adjusted under 35 U.S.C. 154(b) by 47 days.

(21) Appl. No.: 15/999,482

(22) PCT Filed: Feb. 17, 2017

(86) PCT No.: PCT/SE2017/050153
§ 371 (c)(1),
(2) Date: Aug. 20, 2018

(87) PCT Pub. No.: WO2017/142470
PCT Pub. Date: Aug. 24, 2017

(65) Prior Publication Data
US 2019/0030582 A1    Jan. 31, 2019

(30) Foreign Application Priority Data

Feb. 19, 2016 (SE) .................................. 1650225-4
Oct. 12, 2016 (SE) .................................. 1651338-4

(51) Int. Cl.
*B21D 5/00* (2006.01)
*G05B 19/418* (2006.01)
(Continued)

(52) U.S. Cl.
CPC ............. *B21D 5/004* (2013.01); *B21D 5/006* (2013.01); *B23K 15/0046* (2013.01);
(Continued)

(58) Field of Classification Search
CPC ......... B21D 5/004; B21D 5/006; B23P 17/04; B23P 23/04; G06Q 10/043;
(Continued)

(56) References Cited

U.S. PATENT DOCUMENTS 5,801,963 A      9/1998  Sadler et al.
5,828,575 A  *  10/1998  Sakai ................. G05B 19/4097
                                                                  700/182
(Continued)

FOREIGN PATENT DOCUMENTS

CN      102609591 A      7/2012
CN      104907700 A      9/2015
(Continued)

OTHER PUBLICATIONS

Swedish Office Action received in SE Patent Application No. 1651338-4, dated Sep. 16, 2019.
(Continued)

*Primary Examiner* — Charles R Kasenge
(74) *Attorney, Agent, or Firm* — Marshall, Gerstein & Borun LLP

(57) ABSTRACT

A method for selecting optimum operation performance criteria for a metal working process. The method includes the step of developing a process model relating process parameters for the operation with performance variables for said operation, wherein the process parameters and performance variables are retrievable via integrated multiple data sources, and selecting at least one optimization technique to define a function, said function including process parameters. Moreover, the method includes generating the function for optimization by using acceptable tolerances of a product to be machined as a basis to define ranges for performance variables along with ranges for process parameters, and applying the at least one optimization technique to
(Continued)

said function, whereby optimum operation performance criteria are calculated for the process model including process parameters and performance variables to obtain a set of requirements to be used for controlling the metal working process.

20 Claims, 3 Drawing Sheets

(51) Int. Cl.
| | |
|---|---|
| G06Q 10/04 | (2012.01) |
| B23P 17/04 | (2006.01) |
| B23K 26/38 | (2014.01) |
| B23K 15/00 | (2006.01) |
| B23K 26/21 | (2014.01) |
| B23K 31/12 | (2006.01) |
| G05B 19/4093 | (2006.01) |
| G05B 19/18 | (2006.01) |
| B23K 20/10 | (2006.01) |
| B23K 20/12 | (2006.01) |
| G06F 30/00 | (2020.01) |
| B23P 23/04 | (2006.01) |
| G06F 113/24 | (2020.01) |

(52) U.S. Cl.
CPC ............ *B23K 20/10* (2013.01); *B23K 20/122* (2013.01); *B23K 26/21* (2015.10); *B23K 26/38* (2013.01); *B23K 31/12* (2013.01); *B23P 17/04* (2013.01); *B23P 23/04* (2013.01); *G05B 19/18* (2013.01); *G05B 19/40938* (2013.01); *G05B 19/41885* (2013.01); *G06F 30/00* (2020.01); *G06Q 10/043* (2013.01); *G05B 2219/32291* (2013.01); *G05B 2219/35019* (2013.01); *G06F 2113/24* (2020.01)

(58) Field of Classification Search
CPC ................. G06F 2113/24; G06F 30/00; G05B 2219/35019; G05B 2219/32291; G05B 13/024; G05B 19/0405; G05B 19/182; G05B 2219/30; G05B 19/40938; G05B 19/18; G05B 19/41885; B23K 15/00; B23K 26/00; B23K 15/0046; B23K 26/21; B23K 31/12; B23K 20/10; B23K 20/122; B23K 26/38
See application file for complete search history.

(56) References Cited

U.S. PATENT DOCUMENTS

| | | | |
|---|---|---|---|
| 6,847,922 B1 | 1/2005 | Wampler, II | |
| 2003/0204283 A1* | 10/2003 | Picard .................... | B23K 10/00 |
| | | | 700/166 |
| 2005/0005670 A1 | 1/2005 | Durney et al. | |
| 2006/0041448 A1* | 2/2006 | Patterson ............. | G06Q 10/101 |
| | | | 705/301 |
| 2006/0108333 A1* | 5/2006 | Picard .................... | B23K 10/00 |
| | | | 219/121.62 |
| 2009/0240368 A1* | 9/2009 | Young, Jr. .............. | B23K 31/10 |
| | | | 700/166 |
| 2010/0036519 A1* | 2/2010 | Yamada ........... | G05B 19/40937 |
| | | | 700/173 |
| 2012/0197602 A1* | 8/2012 | Hillmann ........... | G05B 19/4099 |
| | | | 703/1 |
| 2014/0121820 A1* | 5/2014 | Das ........................ | G05B 13/04 |
| | | | 700/182 |
| 2015/0161296 A1* | 6/2015 | Apanovitch ........... | B21D 22/20 |
| | | | 700/98 |
| 2015/0165549 A1 | 6/2015 | Beutler | |
| 2015/0205289 A1* | 7/2015 | Henning ................. | G06F 30/20 |
| | | | 700/98 |
| 2017/0308058 A1* | 10/2017 | Kreidler ............. | G05B 19/4069 |

FOREIGN PATENT DOCUMENTS

| | | |
|---|---|---|
| EP | 2169491 A1 | 3/2010 |
| WO | WO-2011042058 A1 | 4/2011 |
| WO | WO-2012035547 A2 | 3/2012 |

OTHER PUBLICATIONS

International Search Report and Written Opinion for PCT/SE2017/050153 dated May 4, 2017.
"A review of optimization techniques in metal cutting processes," Mukherjee I; Ray P K, Feb. 3, 2006, Computers & Industrial Engineering, p. 15-34, vol. 50, nr 1-2, doi:10.1016/j.cie.2005.10.001; whole document; abstract.
Office Action received in SE Application No. 1650225-4 dated Sep. 14, 2016.
Office Action received in SE Application No. 1651338-4 dated May 4, 2017.
Swedish Search Report received in SE Application No. 1651338-4 dated May 4, 2017.
Office Action received for Chinese Application No. 201780019219.8 dated Nov. 26, 2020.
Office Action received for Japanese Application No. 2018-544063 dated Nov. 30, 2020.

* cited by examiner

METHOD AND MACHINE SYSTEM FOR CONTROLLING AN INDUSTRIAL OPERATION

TECHNICAL FIELD

The present invention relates to a method, an industrial machine system, a computer program product and a non-transient computer-readable medium for selecting optimum operation performance criteria for controlling an industrial machining operation, such as a sheet metal working process.

BACKGROUND ART

Industrial machine systems of today typically consist of a machine with an actuator system for providing relative motion between a machine part or operating device and a workpiece. State of the art industrial machine systems are highly specialised to perform operations like for instance beam cutting, milling, turning, drilling, boring, punching, punch pressing, press-breaking, bending, welding and assembly operations. The machine system is a substantial investment to most potential customers, in particular to smaller or medium-sized workshops, why the versatility and productivity that the machine system is to contribute with to the business is a key factor when making investment decisions.

The industrial machine systems are controlled by means of a CNC (Computerized Numerical Control) unit, an NC (Numerical Control) unit, a PLC (Programmable Logical Control) unit and/or related sensing and processing equipment that together serve to provide instructions to an actuator system to perform required movements in order to execute intended industrial operations. The machine system further comprises a machine controller, which is essentially a computer having a processor and a conventional operating system such as Windows or Linux configured to give instructions to the CNC/NC/PLC unit based on machine controller instructions, such as G-code or XML. The machine controller includes or is connected to an HMI (Human-Machine Interface), and is configured to read programs and to gather process parameters so as to yield complete instructions to the CNC/NC/PLC unit for execution by the actuator system comprised in the machine. Conventionally, both the CNC/NC/PLC unit and the machine controller are physically included in the industrial machine, and the industrial machine forms an independent and self-contained industrial machine system wherein the machine controller forms an essential and physically connected part of the machine.

A CNC system may be defined so as to comprise a machine tool, herein referred to as a machine, a part program, which is a detailed set of commands followed by the machine, and a machine controller (or machine control unit), which is a computer that stores the program and executes its commands into actions by the machine tool.

Management, control and monitoring of operations performed by an industrial machine need expertise and experience from a machine operator as well as software-based support systems to work out. To generate a program for the operation of for example manufacturing a particular metal product, the program needs to be based both on a set of predetermined principles, such as the calculation of operating sequences based on optimization techniques or shortest path principles, but also an operator's know-how of what will be the best sequence from a more practical point of view. Variables to consider and control may be related to materials properties, logistics and of course to the actual geometries, shapes, dimensions and order in which products are to be produced.

Prior art technology discloses the establishment of machining or cutting programs which are based on the principle that of single parts are produced as individual units. A wide variety of conventional production methods are used for this purpose, such as cutting, punching and/or pressing. Here, production metrics to be applied for the cutting, punching and/or pressing operation are defined in advance. Individual definitions are made for each part and applicable safety distances between adjacent parts are defined for each individual part.

More recently, the so-called common cut technology has evolved as an improvement to the more conventional cutting techniques. The underlying technique for the common cut technology is based on dividing a workpiece by cutting two adjacent parts, the parts being separated by a distance corresponding to the width of a cut of the cutting beam. Hence, careful consideration must be made, when positioning shapes to be divided from each other, to the width of a cut of the cutting beam, given the prerequisites for that particular cutting operation.

Prerequisites for a cutting operation are to be determined already in connection with initial preparation for and positioning of shapes to be separated along the cutting path. In particular for partially or fully automated processes, careful planning of a common cut machining process is crucial. To realize that common cut cannot be used first after having positioned workpieces for cutting, is too late, since the workpieces cannot be rearranged any more. To realize that common cut could not be used even later, i.e. after the cutting operation has taken place, inevitably leads to deformations and damage to the produced parts, and hence to cassation of produced items.

The above described common cut technique could also be applicable to for example punching or pressing operations, provided that the common cut technique allows parts to be separated from each other without causing damages or deformations, and does not cause the dimensions and quality of the produced item to exceed acceptable tolerances according to specification.

International patent publication WO 2011/042058 discloses a method and a system for machine cutting several parts out of a piece of material using a beam cutting technology. A set of controlling rules and variables are applied for forming a cluster of parts with free form shapes, the parts being positioned so close to each other so that only the thickness of one cut from the cutting beam is found between adjacent parts whenever the shape of the parts allows it.

Since the introduction of free form shapes in cutting operations, the market has quickly realized that the technology has a potential to noticeably increase productivity in sheet metal working processes. One of the first advantages noted from free form cutting is the saving of valuable process time during cutting operations, which is one of the top priorities for competitiveness in production industry. Another advantage provided by the free form shape cutting is that it enables the shapes subjected to cutting to be arranged in a tighter pattern, thereby significantly reducing material waste, which is of benefit both from an industrial and an environmental perspective.

However, common cut technology, also when used in a way to allow for highly efficient production of free form shapes, may inevitably cause minor defects to the workpieces when in operation. Those defects are difficult to completely avoid and need to be considered, in particular for machining operations involving common cut technology. Tagged segments and/or defects that will eventually appear as a result of the machining operation are taken into account already during the initial planning of an industrial machining operation in order not to impede the overall productivity of the operation.

Machining operations of today are based on default data and theoretical parameters, which are stored locally in a database and calculated in advance of the operation. Various steps in a typical machining operation are therefore individually adjusted sequence by sequence. In view of this, a related problem that needs to be at least considered when setting up and performing an industrial machining operation is the large number of dynamic variables that may have an influence on the operation. Some of those variables may otherwise adversely affect the efficiency, precision, quality and productivity of the industrial machining operation, whether the variables are related to logistics, materials properties, production quality, presently used tooling, available tooling or operators' needs.

SUMMARY OF THE INVENTION

It is therefore an object of the present invention to alleviate the mentioned problems associated with prior art technology by providing a method, an industrial machine system, a computer program product and a non-transient computer-readable medium for selecting optimum operation performance criteria for a metal working process, said method comprising the steps of:

providing a process model that relates process parameters for the operation with performance variables for said operation, wherein the process parameters and performance variables are retrievable via integrated multiple data sources, selecting at least one optimization technique to define a function, said function comprising process parameters, generating the function for optimization by using acceptable tolerances of a product to be machined as a basis to define ranges for performance variables along with ranges for process parameters, and applying the at least one optimization technique to said function, whereby optimum operation performance criteria are determined for the process model including process parameters and performance variables to obtain a set of requirements to be used for controlling the metal working process.

The optimum performance criteria calculated for the process model according to the above, result in a set of requirements which are transformed into operational instructions for controlling of an industrial machine. The control is typically executed by means of an industrial machine program, comprising a set of operational instructions that instruct an actuator system to execute machining operations.

More in detail, some of the preconditions that differentiate the present invention from traditional solutions that have been described in prior art, is the full integration of systems, machines, information related to the fourth industrial revolution (IoT) etc., but also of service providers and customers. Full integration of various sources of relevant data enables information relating to a metal working process to be retrieved even in real-time, and according to the present invention, this information may be analysed and utilized. The flexible nature of the process parameters and the performance variables, and the dynamic utilization of this information when optimising the metal working process, may lead to production results that could never be obtained using a sequential analysis or optimisation as a basis for the production planning. The flexibility in process parameters may lead to a significant reduction of waste materials and/or production time (resulting from lesser tools changes etc.) and the flexibility in performance variables may lead to a lower overall production cost, which is beneficial to both the manufacturer and the customer.

By means of the present invention, significant advantages and benefits will be achievable in relation to prior art technology some of which will be mentioned below. The dynamic nature of variables that may have influence and effect the efficiency and productivity of the industrial machining operation, whether the variables are related to logistics, materials properties, tooling availability or operators' needs can be taken into consideration.

The present invention uses information retrieved from multiple sources, and stores such information in a way that it is made available for use in connection with subsequent machining operations. By means of the retrieved information, the invention makes it possible to design and make available new or additional tools or tool geometries as required by the specific machining operation that is to be executed.

In accordance with one alternative embodiment of the invention, the method for selecting optimum operation performance criteria for a metal working process comprises a process model, which is dynamically monitored and controlled.

This dynamic monitoring and control makes it possible to respond to variations in underlying conditions for a metal working process over time. Underlying conditions could either be based on technical properties that may vary over time, such as materials properties of for example sheet metals, geometrical considerations and/or production process related properties, such need for exchange of tooling. Also other properties related to production planning may vary over time, such as production economy, order stock information, pricing, profitability, availability and related priorities. As a third category, properties related to the working environment for an operator may be taken into consideration, such as operator availability, avoidance and heavy lifts for operators, less demanding manual tasks for operators during night shifts, such as machine reconfiguration, which are all properties related to the working environment that may vary over time.

In accordance with an alternative embodiment of the invention the method for selecting optimum operation performance criteria for a metal working process comprises a process model, which is monitored and controlled in real-time to allow for dynamic adjustments in the process.

This has fundamental advantages in comparison with prior art, in particular for production of relatively small batches that require frequent adjustments and reconfigurations of process parameters. In accordance with the invention, a reaction to outer variations may come instantly instead of having to wait for productivity evaluations. Those evaluations are often recurrently scheduled manual calculations to be carried out as a follow-up of output from already completed production processes. The availability of information in prior art of today is insufficient to be able to optimise production processes based on the present demand. A possible optimisation of a production process is therefore oftentimes made too late to benefit from it.

According to the invention, the set of requirements to be used for controlling the metal working process can be provided as recommendations to an operator, who in turn may apply the set of requirements. As an alternative, the requirements may be applied with partial or no operator involvement.

According to yet another embodiment of the invention, the method for selecting optimum operation performance criteria for a metal working process according to claim further comprises the step of:

retrieving process parameters from multiple sources relating to the metal working process, such as production order, product geometry and predefined tolerances, required metal working operations, required tooling configuration, stacking pattern of produced items, and/or process parameter data from previous operations, retrieving performance variables from different sources relating to the metal working process, such as determined tolerances of produced items, process time, tooling availability, machine availability, material availability, tooling lifetime, material removal rate, operator working environment, order stock, delivery time, required pressing position and/or performance variable data from previous operations and/or performance variable data for subsequent operations, storing the process parameters and performance variables in a consolidated memory in association with a computer system, such as an enterprise resource planning (ERP) system, and making the process parameters and or performance variables available for a machine controller or computing system for application of optimization techniques to select optimum operation performance criteria.

The plurality of process parameters are typically retrieved from different sources of information, and a central computer (alternatively machine controller or computing system) may be configured such that it is connected or at least is connectable to these sources of information. The sources of information may be very different and could be considered to be end-points in the machining system.

Process parameters are predefined parameters which typically relate to what is to be produced, what is the order size, which are the optimum machining operations to be performed so as to achieve predefined product geometries? Also optimum tooling utilisation for machining and predefined tolerances of the produced items are process parameters. Performance variables on the other side are data relating to the hypothetical result should other than optimum machining operations or optimum tooling configurations be used. It is also measured data from previous and/or currently and/or subsequent performed operations, which can be used as a basis for decision making, when a number of different variables are to balanced and the machining process is to be optimised. Optimisation can be made based on any variable, such as for example production cost, production time, quality and product precision, operator working conditions, material waste or any combination thereof.

An example of the advantages of the invention is that tooling configuration to be exchanged between subsequent operations can be minimised. Experiences from prior operations can be used to determine whether a present tooling configuration is sufficient for achieving a particular geometry, and whether the produced geometry will be within acceptable tolerances. Another example is that precision can be increased by avoiding tooling contacts with certain areas on items produced which may contain defects.

In accordance with an alternative embodiment of the present invention, tools and/or produced items are embedded with electronics, software, sensors and/or network connectivity. This connectivity, often referred to as Internet of Things (IoT), enables the objects to exchange data, such as process parameters and/or performance variables, with the computer system and/or the computing system. When making an inventory of currently available tools for a certain machining operation, the computer system may then have instant access to updated information on which tools can be used and which cannot, for example due to being used for another machining operation of higher priority.

According to the invention, a surveillance unit is provided, such as a camera or other image capturing means, to detect presence and nature of various defects and/or visual attributes, bulges and/or other asymmetrical attributes created by a bending operation, so as to avoid their interference or any effects derivable from symmetry imperfections when stacking parts. Detailed information on those defects or visual attributes are retrieved, stored and made available when determining a set of requirements to be applied in a process model for a subsequent metal working process.

It is made possible to adapt the pressing position or pressing pressure exerted on a sheet metal product to individual batch differences in properties between sheets metals of the same specification. The pressing position or required pressing coordinates are used to precisely determine whether the pressing pressure exerted is sufficient to reach the predefined position, i.e. a predefined coordinate in space, to which the tools is intended to reach. Retrieving and using process parameters also enables an increase in precision by avoiding tooling, clamping and gripping contacts with less defined areas on items produced.

Among the most valuable advantages of the invention is that information already present in a so-called resource planning system, a business management system which is available in virtually any industrial company, workshop or enterprise, is used to manage and control the industrial machining system. Using this management system for logistics, production, inventories, maintenance, sales, etc., i.e. one or more systems in which all information is available and the dynamics of the business operations conducted are reflected, all aspects influencing the productivity and with relevance to its customers into consideration can be taken into consideration. Such information may even include order availability, customer priorities and pricing information, besides all information related to material properties, batch number, requested dimensions, shapes, tolerances, locations and various machining parameters.

The present invention hence brings together information that is, or could be, contained in an enterprise resource planning system with all requirements and the huge potential efficiency enhancements of modern machining systems, so as to significantly improve the productivity in certain segments of the production industry. The dynamic monitoring and control allows the producer to decrease batch sizes during production and in a near future allows the producer to immediately respond to short-lived variations in the demand. The present invention provides at least a first step towards the industrial vision of production of unique items and on demand.

BRIEF DESCRIPTION OF THE DRAWINGS

Various embodiments and examples related to the present invention will now be described with reference to the appended drawing, in which.

DETAILED DESCRIPTION

Figure 1:
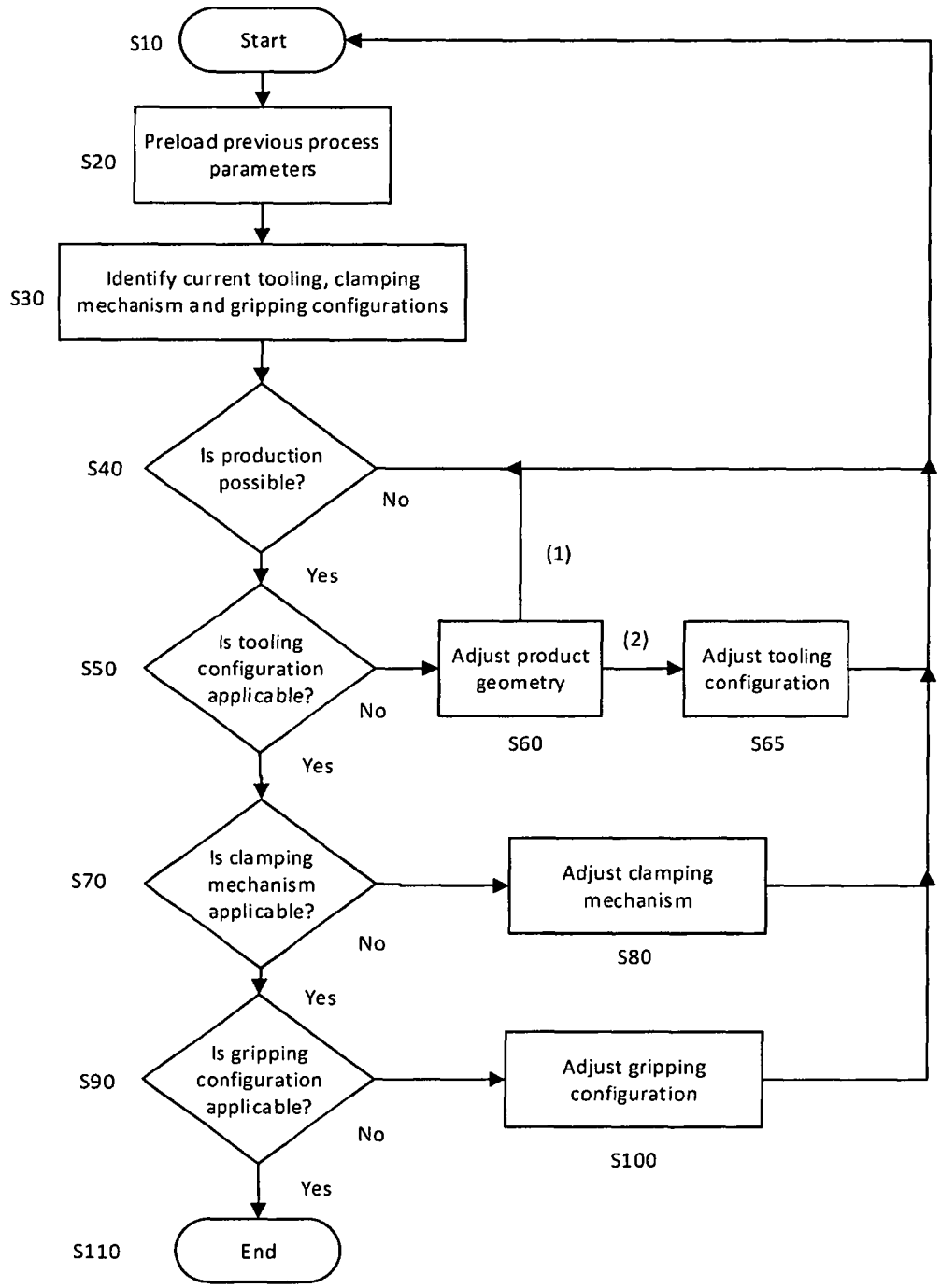
FIG. 1 is a flow chart that depicts an optimisation of an operational sequence of an industrial machine system by monitoring, controlling and adjusting the sequence.

The present invention relates to identification of part geometries, generation of a program for controlling an industrial machine system. It also concerns configuration of an industrial machine system, in particular an industrial machine system for metal working, such as a punch press, press-break or bending machine. Combinations of punch presses and beam cutting machines are also conceivable for use, since such combinations are suitable also for milling and turning operations, besides cutting. Moreover, the invention relates to automation equipment and utilisation of process data obtained during previous machining operations, which data is used as input when planning, configuring, executing and managing a subsequent machining operation.

Both the detailed description and the drawings to which it refers are given by way of example only. Same reference numerals from different figures refer to the same element.

Sheet metal working is a generic term applicable to machining operations generally. Cutting, which is one of the comprised types of operations, is in this context to be construed as a machining operation executed by any of a variety of industrially applicable technologies, including cutting by means of technologies as laser, flames, plasma, water jet, ion, air as well as cutting by pressing, punch pressing and press-breaking. Milling, drilling and turning operations also belong to sheet metal working, provided the operations relate to machining of sheet metal.

Several properties of sheet metal materials, previous logistics operations and machining operations influence the behaviour of the material during processing. Hence products manufactured by a machine using an identical program of operation are influenced by the manner in which the processed material has been previously handled. Most of those physical properties of the material can be determined in advance of the processing, and thereafter retrieved and stored by an enterprise resource planning system. Here the data related to physical properties of the material to be processed is made available for use when planning and optimising machining operations.

Material-oriented properties that vary between subsequent operations are material quality, material compositions, size, shape and production batches that each clearly influences the result and precision achieved during a machining operation, whether it is bending, punching, cutting, milling, drilling, turning etc.

One of the mentioned influential properties is the sheet rolling direction, a variable that is dependent on the prior logistics operations of the material. The sheet rolling direction may have a significant impact on the result of a bending operation. Another property is rotation of parts and mirroring of the sheet metal, whereby rotation and mirroring of identical parts in different directions may have an influence on bending angles for otherwise identical parts. Bending angles may vary as much as by several degrees between two subsequent bending operations. The same is true for other machining operations, such as for beam cutting and punching, whereby rolling direction, part rotation and mirroring may cause tension or expansion of the material. All of the above variables are dependent on the prior logistics of the material.

The processing also influences the workpiece. During machining by means of punch pressing, the pressing operation generates marks that vary between punches of subsequent tools strokes. Another imperfection is the use of so-called micro joints when punching or pressing to fix parts with a surrounding skeleton or to fix several parts to each other.

When applying beam cutting it may be necessary to define a starting point, a so-called lead-in. Micro-joints are generated by closing the cutting path which surrounds the geometry of the part. As previously mentioned, common cutting techniques and clustering of free form shapes may generate different types of marks from tangential points, different types of lead-ins and different types of micro-joints that occur between parts and the surrounding skeleton or between adjacent parts. All of the mentioned marks, lead-ins, micro joints can be seen as part defects or visual attributes. They are all departures from the original drawings, and provided their existence and positions are known in advance of a machining process, the present invention provides a way to completely avoid them and or at least to alleviate any negative influence from them. A first machine operation may have left defects and/or visual attributes, such as hardened or irregular surfaces etc., which makes it even more important for a subsequent machine operation to avoid them in order to protect applicable tooling from being damaged and thus increase its lifetime.

Segments, which are not allowed to comprise any part defects or visual attributes may be marked. This way of marring, managing and avoiding imperfections is called tagging. As a result of marking segments to be avoided, the industrial machining system will not place any lead-ins, micro joints, tangential points or other part defects or visual attributes on these segments. This allows for enhanced part quality and process reliability all through the value chain but also results in increased volumes of scrap, i.e. materials waste. Scrap is undesired and would limit the availability of techniques as common cut or clustering of free form shapes, which would otherwise be a means to enhance the productivity of industrial processes.

Tooling, i.e. a set of suitable tools for executing a bending program, or other machining program, can be chosen both manually or automatically. A commonly used method for placing the workpiece in a precise position before executing for example the bending operation is to position axes of actuators as required. Back gauge, clamping mechanisms or fixtures are used to more accurately position and support a workpiece before the bending operation is executed. All of the above machine configurations and support arrangements generate data, which is collected. Also cutting heads, nozzles, lenses and related optics equipment relating to machining operations generate data that can be collected, provided as feedback and thus taking part in an optimisation of machining operations.

Bending angles and/or back spring can be measured both manually and automatically by means of for example laser, optical, mechanics. Automation units are configured to support an operator to move the workpiece so that sequencing and bending operations can be executed. Processed parts are stacked manually and/or automatically after machining operations have been executed. Stacking is made prior to customer delivery according to a number of guiding principles, some of which are related to operational efficiency, some of which are related to logistics and some of which are related to customer needs.

Figure 2:
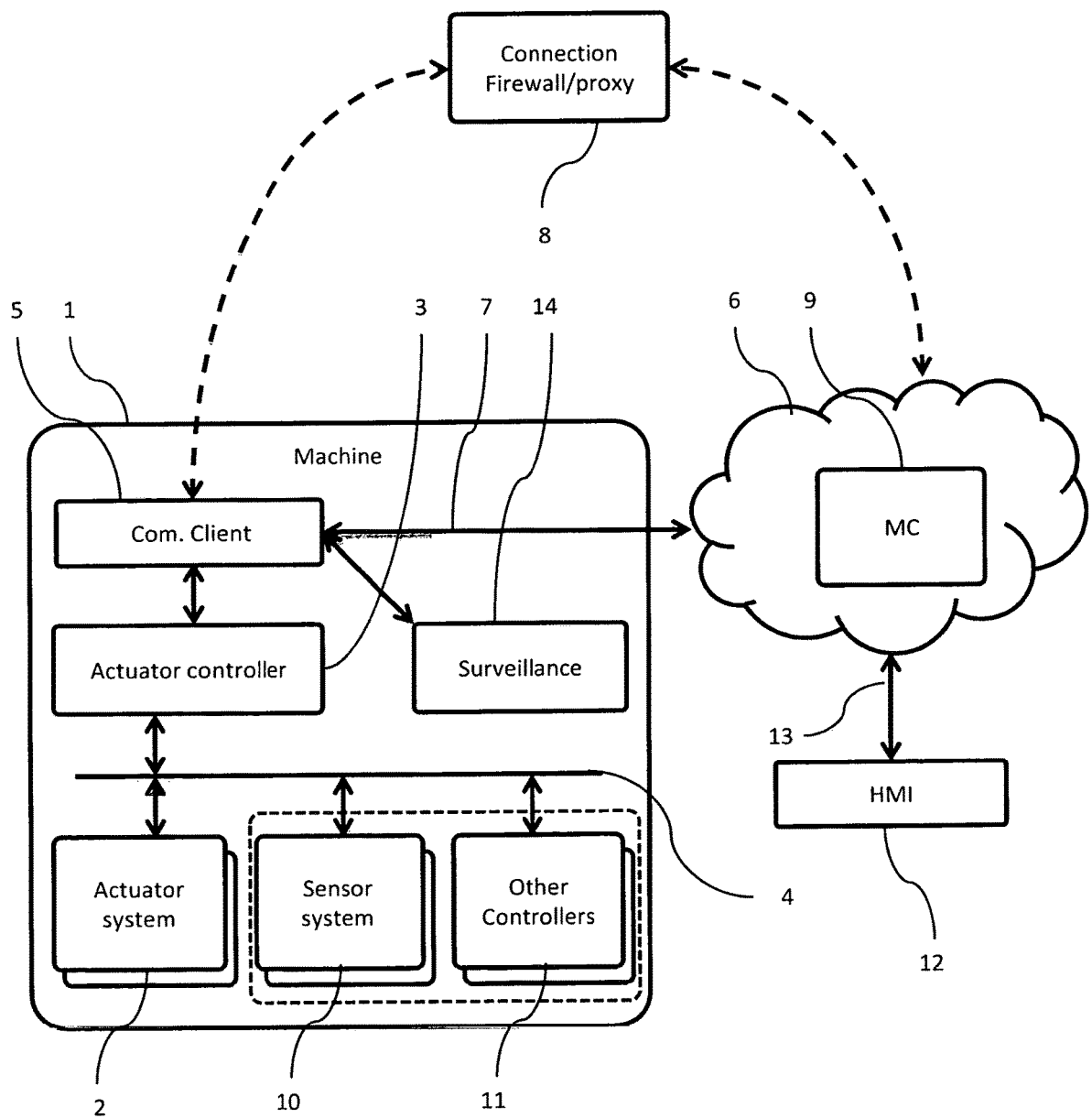
FIG. 2 graphically illustrates an industrial machine system according to one embodiment.
Figure 3:
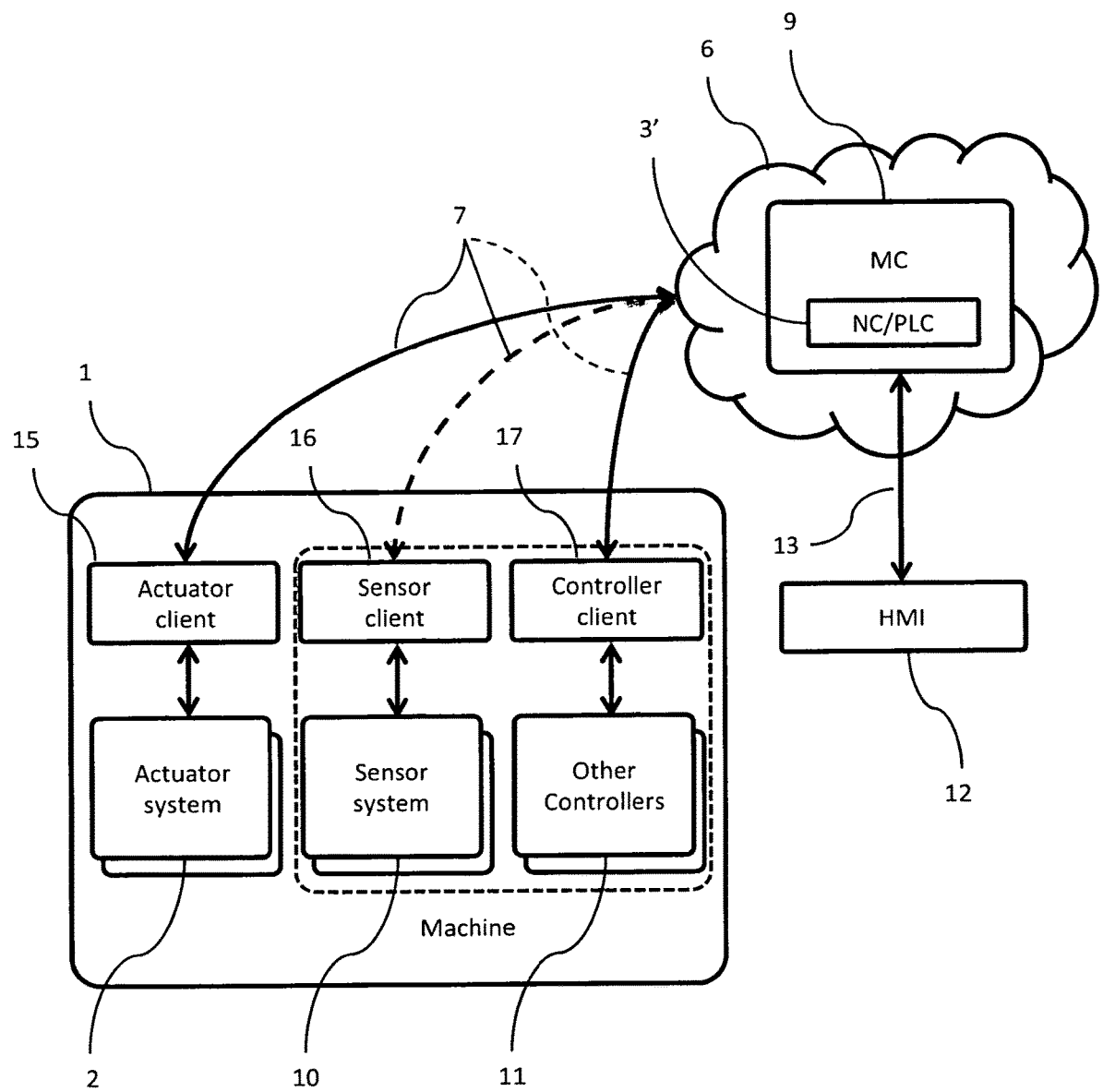
FIG. 3 displays another embodiment of an industrial machine system according to the invention.

The present invention relates to generation of a machining process, such as a program for punching, combinations of punching laser, milling, drilling, turning and/or bending, and takes into consideration information from the previous operation in sheet metal working. The program optimises tooling configuration, through minimising required tooling exchange from a previous operation, minimising the number of tools required and the movements of tools. The program also minimises the motions required so as to reduce cycle time, applicable for an operator and/or automated process. The effort required for an operator to move a workpiece is also considered, which means that the shortest path does not always require the least effort. With reference to FIGS. 2 and 3, the machining program could be made directly on the machine or disconnected from the machine depending on its configuration.

Collisions between a workpiece and the machine and tooling applied, is also considered. Conceivable is to allow collisions to be simulated manually or automatically before executing the program on the machine.

FIG. 1 is a flow chart that depicts an optimization of an operational sequence in an industrial machine system or a manufacturing support system, possibly remote in a central computer which is connected or at least is connectable to multiple sources of data. The system may be configured to provide support for business operations relating to design- and construction processes (including the option of parametric design), selection of material, purchasing, logistics etc., by inputting desired parameters followed by modifying and presenting the optimum performance criteria.

The sequence starts (S10) in that an operator or client either manually or automatically inputs (S20) desired parameters relating to a product to be machined or evaluated. This input of desired product parameters can be made at any location. One example is that an application (app) developed for a mobile terminal, such a so-called smartphone, is used as a tool for realizing the input of desired parameters. This app may then be provided to all stakeholders along the value chain, for example designers, purchasers, logistics professionals, manufacturing specialists etc. In a next step, the computing system according to the invention generates (S30) resulting operational data based on the desired process parameters.

In a first step (S10), the process model is provided (pre-loaded) (S20) with process parameters relating to a previous sheet metal working operation.

In a second step, identification (S30) is made of clamping mechanism, gripping configurations and tooling locked up, i.e. currently applied settings, configurations and tools in the machine.

In the next step, analysis is made of whether the current tooling configuration can be used to effect a complete machining operation of next batch for production (S40), such as a bending operation of parts for subsequent production. An evaluation is also made of whether the current tooling configuration could be improved given an available workpiece for production and its process parameters.

Based on pre-loaded information, also the product geometry is analysed, so as to determine whether an adjustment to the geometry within acceptable tolerances, would be possible to produce given the current set of tooling. Moreover, the tooling available for exchange is analysed, so as to determine whether the original or alternative product geometries, as mentioned still within acceptable tolerances, would be possible to produce given the available tooling. Based on the above information and process optimisation, it is hence determined whether to keep current tooling configuration, adjust the product geometry within tolerance boundaries or exchange at least one tool to execute the currently applicable machining operation (S50, S60, S65). Calculation is also made of the optimum tooling configuration based on tooling availability.

Based on pre-loaded information, it is further determined whether to exchange and/or adjust the back gauge, clamping mechanism and/or fixture (S70), either manually or automatically.

Based on pre-loaded information, calculate whether to exchange and/or adjust gripping tools that position parts for machining (S90) and for suitably also for a subsequent stacking of produced parts. Calculation of the optimum gripping tools is used as a basis for a recommendation of manual adjustments and/or exchanges, which are presented to an operator. Alternatively, partly or fully automatic adjustments and/or exchanges may be executed by the machine with little or no active involvement of an operator.

The determination of whether the current machine configuration enables production of an item according to its process parameters (S40) also includes determination of other enabling requirements besides the tooling configuration. Examples of the requirements may be missing spare parts, missing tooling, need for maintenance, material quality, shape, dimension and/or material of a part to be manufactured. Process parameters and performance variables relating to the requirements are stored in the computer system, the computing system and/or a central computer which is connected or at least is connectable to a plurality of sources of data, and in connection with the machine. The requirements relating to a process to be executed may be responded to by issuance of a purchase order or operator recommendation. Such a purchase order may be issued automatically, i.e. without direct involvement of an operator, or as a recommendation presented to an operator, who is to execute the order accordingly. In case a production process results in products outside of the tolerance limitations, a supplementary production order may be placed without direct operator involvement so as to meet customer demands on quality and precision in the delivery.

Parts are identified before the machining operation by using any known identification method, such as computer vision or other image capturing technology, to identify geometries, defects and/or engraved, marked or other visual attributes of parts to be machined.

Back gauge, clamping mechanism and/or fixture are configured to avoid defects and/or visual marks from the previous operations from coming in direct contact with the back gauge. This allows the workpiece to be positioned correctly and in direct contact with its support when executing bending operations. Moreover, bending pressure is adapted so as to generate correct bending angles based on data from prior operations, by means of using a bending angle measuring system which is provided with feedback from prior operations, whereby every bend produced has an angle within acceptable tolerances.

Required attributes described above, i.e. composition, batch, sheet rolling direction-rotation, part rotation, part mirroring, clustering, common cut, lead-ins, micro joints, etc. are continuously monitored. In result of detected variation of any of the attributes, process parameters, i.e. bending position, bending pressure, crowning data, angle measurement data, back spring measurement data, positions of back gauge, clamping mechanisms and fixture, tools radius compensation, tooling condition etc., are correspondingly adjusted to ensure a correct position of the workpiece and machining resulting in parts with acceptable tolerances. By crowning is here meant a technique used to compensate for deviations along a bending line.

Parts may be visually inspected after the bending operation to identify geometries in combination with defects, visual attributes, such as bending lines, bulges and/or asymmetries created by the bending operation. In result of the identified defects or visual attributes, stacking of parts may be made to avoid placing defects between parts thus affecting the symmetry of the stack.

In parallel with the generation of operational data, the computing system (or central computer), which is be connected to or at least is connectable with plural sources of data, selects (S40) at least one optimization technique to define a function, a function which comprises the desired process parameters. This is followed by generation (S50) of a function for optimization by using the desired process parameters as a basis to define ranges for performance variables along with ranges for process parameters.

The generated function for optimization is applied (S60) whereby optimum operation performance criteria can be determined for the process model including process parameters and performance variables to obtain a set of requirements to be used for controlling the metal working process.

As soon as the optimum performance criteria have been determined, the resulting operational data is compared (S70) with the optimum operation performance criteria, and in case there is a difference, and the optimum performance criteria seems to provides a performance advantage to the operator or client, the result is presented (S80) to a decision-making entity. This decision-making entity, whether being a human operator, a computerised, fully or semi-automated service layer, is allowed to modify (S90) the desired process parameters based on the presented optimum operation performance criteria for the metal working process. The decision-making entity may also be realized in the form of an application (app) for a smartphone, preferably the same or an app similar to the one mentioned in connection with the step of inputting desired parameters.

If the decision-making entity decides to modify process parameters comprised in the presented information (Yes), the proposed operational sequence is adopted by the industrial machine system. In case the decision-making system decides not to accept the proposal (No), the sequence continues in that the originally generated operational data is applied (S100). Whichever decision is made, the sequence continues to the starting point (S10) or end point (S110). Modified data may further be used in different applications such as CAD, CAM, ERP, MES, CRM, Sourcing management etc. The present invention is also applicable within areas such as purchasing and optimization of machine performance criteria, criteria which may be defined as instructions and/or a program of instructions for the control an industrial machine, such as a CNC machine tool.

FIG. 2 graphically illustrates a first embodiment of the invention. The system comprises a machine 1, which may be a machine for beam cutting (2- or 3-dimensional), punching, punch pressing, press-breaking, bending, gluing, sewing, tape and fibre placement, milling, drilling, turning, routing, picking and placing and combinations of such machines. Beam cutting includes techniques such as laser, welding, friction stir welding, ultrasonic welding, flame and plasma cutting, pinning and sawing.

The machine comprises an actuator system 2 for performing an industrial operation. The actuator system comprises at least one actuator, i.e. a motor for linear or rotational movement. Typically, the actuator system is configured for performing two-dimensional or three-dimensional movements of an operational part of the machine and a workpiece relative to each other.

The actuator system is controlled by an actuator controller 3 in the form of a CNC/NC/PLC unit and/or related sensing and processing equipment. The actuator controller controls the actuator on a low level, i.e. by sending low level control commands for the actuation of the actuator system. The actuator system is connected to the actuator controller via a machine internal communication network 4, e.g. including a communication bus.

The machine optionally comprises other systems, such as a sensor system 10 for sensing various processing parameters of the machine and other controllers 11 for processors, networks, communication links or other computing devices for transmitting data and making decisions. These systems may also be connected to a machine common internal communication network 4 and to the computing system in connection with the machine, such that the machine controller is connected to the sensor system to receive sensor data. The machine controller may be further configured to remotely control the actuator system of the machine in response to the sensor data.

As an alternative configuration, the CNC/NC/PLC unit and/or related sensing and processing equipment as well as the mentioned machine controller may be physically attached to or otherwise included in the industrial machine. The industrial machine then forms an independent and self-contained industrial machine system, wherein the machine controller forms an essential and physically connected part of the machine. Both of the two alternative embodiments of industrial machine systems have their respective advantages, and for the purpose of the present invention, integrated or remote configurations of sensor system and actuator controller are both equally applicable.

The machine may also comprise a communication client 5 connected to the actuator controller 3 for establishing communication with a computing system 6 in connection with the machine, when configured according to the remote alternative. The communication client is then a functional unit which enables the machine or any sub-component of the machine to communicate with the machine controller. The computing system in connection with the machine may be a cloud-based computing system connected to the internet. A centrally arranged computer in connection with or connectable to a plurality of data sources is an alternative embodiment. The communication client 5 and the computing system in connection with the machine may be configured to establish secure communication 7 with each other over the internet, for instance by initiating encrypted communication by HTTPS/TSL or by establishing a VPN (virtual private network). Alternatively, the communication may be established over a firewall or a proxy server 8. As a further alternative, any sub-component of the machine, such as the actuator controller 3, may be configured to connect to the computing system 6 in itself, or alternatively to the mentioned central computer with access to multiple data sources, but as mentioned both remote and integrated configurations are equally applicable for this purpose.

The mentioned computing system 6 in connection with the machine comprises a machine controller 9, wherein the machine controller may be remotely connected to the machine, and wherein the machine controller may be configured to control the actuator system of the machine remotely via the actuator controller by modifying operational parameters of the actuator controller.

The machine controller 9 is hosted in a virtual machine in the remote computing system 6. In that way the machine controller resource may be exploited in an efficient way. The machine controller may e.g. be configured to read and execute machine program code, control machine parameters, allow manual control or adjustments of machine parameters, and function as an interface to associated systems. The machine controller is connected to a HMI (Human-Machine Interface) unit 12 which may be remotely connected to the machine controller via an internet connection 13 and in another embodiment is integrated with the machine. Either way, an operator of the machine may supervise and control the operation of the machine from a remote location, e.g. connected to the internet. The HMI unit 12 and/or remote computing system 6 may be configured to require user identification of an operator, e.g. by requiring passwords or other identification means.

One alternative embodiment of the invention as illustrated in FIG. 2. Locally on the machine 1, an actuator system 2, comprising actuators for performing machining operations is included. An actuator controller 3 is part of or connected to the actuator system 2. The actuator controller is configured to receive instructions from the remote machine controller and execute instructions block by block in a closed loop system. Each task performed by an actuator is hence monitored and after a completed sub-operation, the actuator will perform the next sub-operation until a whole operation is completed. This means that the operation of the actuators of the machine is controlled by the actuator controller on a low level. The actuator controller typically includes a memory and a processor in order to save and execute instructions and to log data. The actuator system does not involve a conventional machine controller or HMI. The actuator system of the machine is hence dependent on receiving instructions from the remote machine controller. Once a complete set of work instructions or a defined sub-set thereof have been received and verified it may however be executed without further instructions from the machine controller. A sub-set of work instructions may be a part of a complete machine operation, but at least involves enough information for the actuator system to perform a part of a complete operation. The operation is preferably performed step by step in a closed loop system within the machine. The machine is only furnished with simple functions such as an emergency stop button and an on/off button. Other than that the machine is dependent on commands from the remote machine controller to operate.

The machine controller is physically located remote from the machine, typically in the cloud. The monitoring of an ongoing process, loading of instructions, modification of instructions and creating new instruction may only be made at the remote machine controller. Hence, the inventive machine controller corresponds to a conventional machine controller, only it is not a physical part of the machine but remote connected to the machine. The instructions monitored and controlled by the machine controller and the interconnected HMI include operational parameters such as cutting velocity, cutting depth, pressure and so on.

The machine controller is not part of the closed loop system of the actuator controller. Hence, unless new instructions are sent from the machine controller, the actuator system at the machine will conclude a fully received operation instruction without awaiting further instructions, unless specific instructions to conclude or alter the operation are received from the machine controller. Typically though, instructions are only provided for a full operation and new instruction will therefore only count for subsequent operations, not ongoing operations. This may be set as a safety arrangement but is up to the operator to decide which type of operational security should be implemented.

The machine controller is configured to send instructions, instruction per instruction, or several instructions in a batch system. Any conventional manner of sending information may be utilized. The machine controller is further configured to receive information and make decisions based on said information. For example, the machine controller may act on feedback data and make decisions and/or send new instructions based on said feedback.

The inventive system provides for a possibility of remote controlling of an industrial machine, without risking that commands are lost as a consequence of bad communication due to for instance latency in the internet connection. This is made sure e.g. because an operation is received and acknowledged in full at the actuator controller.

In order to facilitate surveillance, the machine comprises a surveillance unit 14, such as a camera, video camera or other image capturing means, for monitoring operations by the machine. The surveillance unit is connected to the remote computing system 6 via the communication client 5 and configured to provide operational information to the remote computing system. The operational information is processed and transmitted to the HMI 12.

The machine controller is configured to receive a machine program from a CAD/CAM system or by manual entry from an operator, e.g. via the HMI unit 12.

In one embodiment the remote computing system is configured to monitor an operational parameter of the machine, and disable the remote control of the actuator system of the machine by the machine controller when the operational parameter exceeds a threshold value. Such an operational parameter may be the operating time, the number of operational cycles performed by the machine etc. Thus the operational costs and the use of the machine may be controlled and limited by limiting access to the machine controller.

The remote computing system is configured to collect machine and/or production data and transfer the data to another system (not shown) for data analysis and/or optimization. The machine data may be used to e.g. optimize the supply chain (purchase, manufacturing, distribution), the demand chain (marketing, sales, service), machine maintenance or for other big data applications.

The surveillance unit may also be configured for monitoring produced items and their various properties, including their tolerances. Computer vision is another term used in the industry for this identification of properties related to geometry. By tolerances is meant material properties, such as hardness, toughness, size, shape, product geometries, such as radii, angles and dimensions, and production defects, such as, bulges, bending lines, pressure deformations and/or other visual attributes. The surveillance unit may further be connected to the computing system 6 in connection with the machine, via the communication client 5 and configured to provide operational information to the computing system.

In one embodiment the computing system in connection with the machine is configured to monitor an operational parameter of the machine, and disable the remote control of the actuator system of the machine by the machine controller when the operational parameter exceeds a threshold value. Such an operational parameter may be the operating time, the number of operational cycles performed by the machine etc.

The computing system is configured to collect machine and/or production data and transfer the data to another system for data analysis and/or optimization. This system may be an enterprise resource planning system (ERP) of manufacturing execution system (MES) of any kind. The machine data may be used to for example optimize the supply chain, i.e. purchase, manufacturing and distribution; the demand chain i.e. marketing, sales and service; and maintenance of the machine or its integrated or remote parts. Machine data may also be made available for other systems, such as big data applications designed merge data and draw conclusions based on very large amounts of information.

FIG. 3 displays an alternative embodiment of an industrial machine system according to the invention. The industrial machine system differs from what is described in relation to FIG. 1 in that the machine does not comprise an actuator controller. The actuator controller 3' is physically disconnected to the machine and comprised in the computing system 6 in connection with the machine. The computing system is connected to the machine via one or more data lines 7, e.g. over the internet, which may be encrypted. The machine 1 comprises at least one communication client 15 for establishing communication between the machine and the computing system 6 in connection with the machine. This communication client 15 is connected to the actuator system 2 of the machine, and thus called the actuator client. The client is configured to send and receive low level communication from the actuator controller to the actuator system. Similarly, the machine may optionally comprise a sensor communication client 16 for communicating any sensor data from the sensor system 10, and any further controller clients 17 for communicating with other controllers 11 in the machine. Similar to what is shown in relation to FIG. 2, the communication between the machine and the computing system in connection with the machine may be the established over a firewall or a proxy server.

Below will follow examples of the present invention, intended to further elucidate the function and working principles. As has been explained in connection with the background of the invention, traditional processes of production planning in accordance with prior art are sequential to their nature. This means that information to control a sequence is collected from a local database, and the production planning is made in response to instructions emanating from locally stored information. An example of this could be 1) retrieve an order, 2) select or create at least one controlling algorithm, 3) produce a part of a certain raw material quality, and 4) form a certain component by means of bending, milling, turning, etc., 5) deliver the component to a customer according to order specifications. As mentioned, this process is sequential, and data to control the process is collected from a local database.

The present invention, as has been previously described, utilizes various sources to collect information via the mentioned central computer, such as a batch of orders including geometric drawings, a batch of material, a batch of tools and a machine's existing configuration.

Information relating to the production process according to this specification generally comes from different sources, e.g. an ERP/MES, the machine, IoT information, CAD/CAM and one or more surveillance units. The information collected by means of a central computer, which is configured as an intermediate means, that is situated in-between various end-points. The end-points are typically sources of information that may or may not influence a production process, and are comprised of for example the previously mentioned ERP/MES, the machine, IoT information, CAD/CAM and surveillance units.

The central computer may either be a general purpose computer or the computer that is configured to function as the machine control. The central computer will always be connected, or is connectable, to at least two end-points comprising data, in order to obtain information subject to optimization. That is believed to be a minimum requirement in order to carry out and fully accomplish a non-sequential optimization process on multiple variables. Several methods of optimization may be used, based on combinatorics, dynamic variation, multivariate analysis etc. Any of the methods allow for non-sequential and non-linear optimization, and are well-suited for use in complex systems with large numbers of dynamic variables.

The present invention utilizes non-sequential optimization, which is a numerical process or method that is neither sequential nor linear as compared to traditional processes. Several of the steps in a production process may be subject to optimization. One example is geometry of parts to be produced, a geometry that may be modified to reduce tool changes, another example is scheduling jobs may be altered to reduce setup time provided that information is retrieved from for instance a machine, a surveillance unit and/or from IoT information sources, third and fourth examples are scheduling jobs that may be adjusted to reduce material changes, provided that information is gathered from at least two end-points, and information that can be read and reused from previous process steps, e.g. visual attributes via a surveillance unit or modification of tool combinations or the rotation of a part on its surface. Other conceivable examples are to reconfigure machine tools, such as the back-gauge positioning, pressure, pressing position etc. or the ordering of tools, materials, maintenance, spare parts for reducing production disruptions.

One of the prerequisites to making this type of optimization is to allow retrieval of data from a variety and a plurality of sources e.g. ERP/MES, the machine and its configuration, IoT information, CAD/CAM, surveillance unit. Information is then collected in and made available from the central computer in order to allow for optimization of several separate process steps in relation to their current status, including dynamic influences that are not controllable, since being dependent circumstances on out of reach, such as updates in a management system.

The present invention may also introduces control of the so-called modifiability and customizability in various end-points (data sources), such as ERP/MES, the machine and its configuration, IoT information, CAD/CAM (both with respect to design and configuration) and at least one surveillance unit. For example, by means of the present invention, it is possible to change the materials specification as a measure to potentially reduce material and tool changes, the mandatory tolerance intervals and relevant ranges of strength and solidity. In accordance with another embodiment of the invention, it is also possible to change the product geometry/shape to minimize tool changes but still maintain tolerances from drawings or as an alternative, on which coordinates visual marks exist that can be back gauge positioned for complete avoidance. Is may also be possible to schedule jobs to reduce material/tool replacement while keeping the delivery time. This allows communication with the customer so as to possibly allow the delivery time to be a variable influencing the price of the produced item. In order to achieve those options and new opportunities, two or more end points must be able to control in a non-sequential fashion, e.g. via the machine tool, via IoT information and a database in ERP/MES to schedule orders, tools, materials change, change product geometry. For instance, an amendment to the geometry that may lead to a reduction or minimization of tool changes can be checked against any form of tolerance interval in a drawing that can be available in ERP/MES or even available at a customer or designer as a variable influencing the ration between production cost and market price.

As has become apparent based on the above, the present invention is differentiated from traditional prior art process planning by means of MES systems of production scheduling that are configured to retrieve information from a local database. Those systems may even be based on the functionality that an operator keys in data on orders and delivery, which is followed by sequential scheduling. The present invention is based on an entirely different level of optimization based on actual, even real time data, a central computer that retrieves, a computer that also in some cases may share information. The central computer is connected or connectable to two or more end points, such as ERP, MES, CAD, CAM, machine, IoT information sources, at least one CRM management system and/or surveillance unit. In addition to that, the central computer may also be connected or connectable to other providers of information relating to multiple variables influencing production, such as materials, tooling, spare parts, maintenance, design, specification or customers of parts, constructions and/or products.

The invention claimed is:

1. A method for selecting optimum operation performance criteria for a metal working process, said method comprising the steps of:
   retrieving process parameters from multiple sources relating to the metal working process;
   retrieving performance variables from different sources relating to the metal working process, the performance variables comprising performance variable data for subsequent operations;
   storing the process parameters and the performance variables in a consolidated memory in association with a computing system;
   making the process parameters and/or the performance variables available for the computing system for applying at least one optimization technique to select the optimum operation performance criteria;
   providing a process model that relates process parameters for the operation with performance variables for said operation,
   selecting the at least one optimization technique to define a function, said function comprising the process parameters,
   generating the function for optimization by using acceptable tolerances of a product to be machined as a basis to define ranges for the performance variables along with ranges for the process parameters,
   applying the at least one optimization technique to said function, whereby the optimum operation performance criteria are determined for the process model including the process parameters and the performance variables to obtain a set of requirements to be used for controlling the metal working process,
   wherein the process parameters comprise one or more of a production order, product geometry and predefined tolerances, required metal working operations, required tooling configuration, stacking pattern of produced items, and process parameter data from previous operations, and
   wherein the performance variables comprise one or more of determined tolerances of produced items, process time, tooling availability, tooling lifetime, material removal rate, operator working environment, order stock, delivery time, required pressing position, and performance variable data from previous operations,
   comparing the retrieved process parameters relating to the metal working process from previous operations with a current machine configuration comprising parameters relating to tooling,
   determining if the current machine configuration enables production of an item according to its process parameters,
   evaluating the applicability of the tooling configuration, which when required, in a first optional step results in adjustments to the product geometry within acceptable tolerances, and in a second step results in adjustments to the tooling configuration, and
   whereby any adjustments made result in a new current machine configuration to be compared with parameters from previous operations.

2. A method for selecting optimum operation performance criteria for a metal working process according to claim 1, the metal working process being any industrially applicable cutting technology based on laser, flames, plasma, water jet, ion, air, bending, pressing, punch pressing, press-braking, milling, drilling and turning.

3. A method for selecting optimum operation performance criteria for a metal working process according to claim 1, wherein the metal working process relates to machining of sheet metal.

4. A method for selecting optimum operation performance criteria for a metal working process according to claim 1, wherein the process model is dynamically monitored and controlled.

5. A method for selecting optimum operation performance criteria for a metal working process according to claim 1, wherein the set of requirements to be used for controlling the metal working process can be provided as recommendations to an operator or alternatively can be applied with partial or no operator involvement.

6. A method for selecting optimum operation performance criteria for a metal working process according to claim 1, wherein the predefined and/or determined tolerances of produced items include any of the following performance variables:
   material properties,
   product geometries, and
   production defects.

7. A method for selecting optimum operation performance criteria for a metal working process according to claim 1, wherein the product geometry includes data on bending curves, compensation factors and tooling preferences.

8. A method for selecting optimum operation performance criteria for a metal working process according to claim 1, wherein identification of defects or visual attributes on produced items are taken into consideration when stacking of workpieces following machining operations.

9. A method for selecting optimum operation performance criteria for a metal working process according to claim 1, wherein the determination of whether the current machine configuration enables production of an item according to its process parameters in addition to the tooling configuration also includes determination of other enabling requirements, whereby corresponding process parameters and/or performance variables are stored.

10. A method for selecting optimum operation performance criteria for a metal working process according to claim 9, wherein stored process parameters and/or performance variables are responded to.

11. A method for selecting optimum operation performance criteria for a metal working process according to claim 1, wherein the method is adapted to be used in a computer numerical control (CNC/NC) or programmable logic controller (PLC) system.

12. An industrial machine system comprising:
a machine comprising an actuator system for performing an industrial operation, and
the computing system, wherein the computing system is in connection with the machine and comprises a machine controller, and the machine controller being adapted for carrying out the method according to claim 1.

13. An industrial machine system according to claim 12, further comprising a surveillance unit in connection with the computing system, the surveillance unit for capturing image information related to process parameters and performance variables of the industrial operation.

14. The industrial machine system according to claim 13, wherein the surveillance unit comprises an image, image sequence or video capturing means to identify part geometries in combination with any visual attribute created by the machining operation.

15. The industrial machine system according to claim 12, wherein the computing system is configured to collect data and use the data for data analysis and/or optimization and/or transfer the data to another system for data analysis and/or optimization.

16. The industrial machine system according to claim 12, wherein the machine system is a press-brake or bending machine.

17. Computer program product comprising a processor and a memory storing computer program code, which when executed enables a processor in a computer to perform the method according to claim 1.

18. A non-transient computer-readable medium or media comprising data representing coded instruction sets configured for execution by a processor in a computer, the instructions comprising the method according to claim 1.

19. A method for selecting optimum operation performance criteria for a metal working process, said method comprising the steps of:
retrieving process parameters from multiple sources relating to the metal working process;
retrieving performance variables from different sources relating to the metal working process, the performance variables comprising performance variable data for subsequent operations;
storing the process parameters and the performance variables in a consolidated memory in association with a computing system;
making the process parameters and/or the performance variables available for the computing system for applying at least one optimization technique to select the optimum operation performance criteria;
providing a process model that relates process parameters for the operation with performance variables for said operation,
selecting the at least one optimization technique to define a function, said function comprising the process parameters,
generating the function for optimization by using acceptable tolerances of a product to be machined as a basis to define ranges for the performance variables along with ranges for the process parameters,
applying the at least one optimization technique to said function, whereby the optimum operation performance criteria are determined for the process model including the process parameters and the performance variables to obtain a set of requirements to be used for controlling the metal working process,
wherein the process parameters comprise one or more of a production order, product geometry and predefined tolerances, required metal working operations, required tooling configuration, stacking pattern of produced items, and process parameter data from previous operations, and
wherein the performance variables comprise one or more of determined tolerances of produced items, process time, tooling availability, tooling lifetime, material removal rate, operator working environment, order stock, delivery time, required pressing position, and performance variable data from previous operations;
comparing the retrieved process parameters relating to the metal working process from previous operations with a current machine configuration comprising parameters relating to clamping mechanism and/or gripping configuration,
determining if the current machine configuration enables production of an item according to its process parameters,
evaluating the applicability of the clamping mechanism, which when required results in adjustments to the clamping mechanism, and/or
evaluating the applicability of the gripping configuration, which when required results in adjustments to the gripping configuration, and
whereby any adjustments made result in a new current machine configuration to be compared with parameters from previous operations.

20. A method for selecting optimum operation performance criteria for a metal working process, said method comprising the steps of:
retrieving process parameters from multiple sources relating to the metal working process;
retrieving performance variables from different sources relating to the metal working process, the performance variables comprising performance variable data for subsequent operations;
storing the process parameters and the performance variables in a consolidated memory in association with a computing system;
making the process parameters and/or the performance variables available for the computing system for applying at least one optimization technique to select the optimum operation performance criteria;
providing a process model that relates process parameters for the operation with performance variables for said operation,
selecting the at least one optimization technique to define a function, said function comprising the process parameters,
generating the function for optimization by using acceptable tolerances of a product to be machined as a basis to define ranges for the performance variables along with ranges for the process parameters, and
applying the at least one optimization technique to said function, whereby the optimum operation performance criteria are determined for the process model including the process parameters and the performance variables to obtain a set of requirements to be used for controlling the metal working process,
wherein the process parameters comprise one or more of a production order, product geometry and predefined tolerances, required metal working operations, required tooling configuration, stacking pattern of produced items, and process parameter data from previous operations, wherein the performance variables comprise one or more of determined tolerances of produced items, process time, tooling availability, tooling lifetime, material removal rate, operator working environment, order stock, delivery time, required pressing position, and performance variable data from previous operations, and wherein tools and/or produced items are embedded with electronics, software, sensors and/or network connectivity, which enables the electronics, software, sensors and/or network connectivity to exchange process parameters and/or performance variables with the computer system.

* * * * *